United States Patent
Dalal et al.

(10) Patent No.: US 9,880,744 B1
(45) Date of Patent: Jan. 30, 2018

(54) METHOD FOR FLASH-FRIENDLY CACHING FOR CDM WORKLOADS

(71) Applicant: Veritas Technologies LLC, Mountain View, CA (US)

(72) Inventors: Chirag Dalal, Pune (IN); Vaijayanti Bharadwaj, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 14/978,071

(22) Filed: Dec. 22, 2015

(51) Int. Cl.
*G06F 3/00* (2006.01)
*G06F 3/06* (2006.01)

(52) U.S. Cl.
CPC ............ *G06F 3/061* (2013.01); *G06F 3/065* (2013.01); *G06F 3/0655* (2013.01); *G06F 3/0685* (2013.01); *G06F 3/0688* (2013.01)

(58) Field of Classification Search
CPC .................................. G06F 3/061; G06F 3/065
USPC .......................................................... 711/103
See application file for complete search history.

(56) References Cited

U.S. PATENT DOCUMENTS

| | | | | |
|---|---|---|---|---|
| 5,752,264 A | * | 5/1998 | Blake | G06F 12/084 711/122 |
| 8,397,016 B2 | * | 3/2013 | Talagala | G06F 12/02 711/103 |
| 9,195,598 B2 | | 11/2015 | Benhase et al. | |
| 2003/0110343 A1 | | 6/2003 | Hagiwara et al. | |
| 2003/0204698 A1 | * | 10/2003 | Sachedina | G06F 12/0806 711/170 |
| 2010/0023682 A1 | | 1/2010 | Lee et al. | |
| 2012/0158674 A1 | | 6/2012 | Lillibridge | |

OTHER PUBLICATIONS

International Search Report and the Written Opinion of the International Searching Authority, PCT/US2016/068013, dated Mar. 17, 2017.

* cited by examiner

*Primary Examiner* — Jae Yu
(74) *Attorney, Agent, or Firm* — Patent Law Works LLP (57) ABSTRACT

A processor-based method for flash-friendly caching is provided. The method includes reading data from a first memory and writing the data to a second memory, in a cache. The method includes performing an aligned block write of data from the second memory in the cache to a flash memory in the cache, responsive to accumulating sufficient data for the aligned block write.

19 Claims, 7 Drawing Sheets

METHOD FOR FLASH-FRIENDLY CACHING FOR CDM WORKLOADS

BACKGROUND

Software development and testing scenarios are among the largest consumers of copies of production data. In a typical software development and test setup, an appliance (e.g., a data storage system) takes a snapshot of data files and exports snapshots through a file system. Copy data management (CDM) techniques and systems can be employed to handle these sorts of workloads. In these scenarios, application virtual machines (i.e., virtual machines running applications) mount the file system. Each of the multiple virtual machines in the software development and test setup has its own set of data files, but there is generally a lot of data in common across the data files. Developers try out code changes on a dataset, and different tests are executed on the same dataset simultaneously in different virtual machines. The applications run on the virtual machines and perform transactions on the data files. These transactions may update data and those are captured on the appliance. The appliance has data in data files for multiple points in time. A storage stack in such an appliance is generally more optimized for backup and restore, which involves large sequential writes, large sequential reads, and a large amount of capacity. This is not efficient for small, random reads and random writes that applications typically do while performing transactions. It is within this context that the embodiments arise.

SUMMARY

In some embodiments, a processor-based method for flash-friendly caching is provided. The method includes reading data from a first memory and writing the data to a second memory, in a cache. The method includes performing an aligned block write of data from the second memory in the cache to a flash memory in the cache, responsive to accumulating sufficient data for the aligned block write.

In some embodiments, a tangible, non-transitory, computer-readable media having instructions thereupon which, when executed by a processor, cause the processor to perform a method is provided. The method performed through the instructions include reading data from a first memory that is external to a cache and writing the data to a second memory that is internal to the cache. The method performed through the instructions includes writing, using an aligned block write, data from the second memory to a flash memory that is internal to the cache, responsive to accumulating sufficient data in the second memory for the aligned block write.

In some embodiments, a flash-friendly caching system is provided. The system includes a second memory, having RAM (random access memory), a flash memory, coupled to the second memory, the second memory and the flash memory forming a cache, and a processor, coupled to a first memory and the cache. The processor is configured to perform actions that include reading requested read data from the first memory, responsive to determining that the requested read data is not available in the cache and writing the read data to the second memory, responsive to reading the read data from the first memory. The actions include writing data from the second memory to the flash memory as an aligned block write, responsive to accumulating sufficient data in the second memory to perform the aligned block write.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A flash-friendly cache, with features suited to block aligned writes to flash memory, provides data quicker and faster (i.e., with lower latency and higher throughput) to machines running application workloads than previous systems serving data from backend memory. The embodiments support running application workloads directly off of backup data without restoring the backup data, thus saving a significant amount of time and storage space while still maintaining integrity of backup data. The flash-friendly cache has a random access memory (RAM) or RAM-based data stage, with two alternating sections in some embodiments. The data stage is synchronized to a chunk database in flash memory, when sufficient data has accumulated in the data stage for an aligned block write (i.e., a write that is aligned to block boundaries in address space) to flash memory. Some versions have a first-hit cache and an N-hit cache. When read data is available in either the RAM-based data stage or the chunk database in flash memory, the data is read from either in some embodiments. When read data is only available from the backend memory, the data is read from the backend memory and also written to the data stage, where the data awaits an aligned block write to the chunk database in flash memory. Write data, destined for the backend memory, is written to the data stage, later written in an aligned block write to the chunk database in flash memory, and still later flushed in a modified block from the chunk database in flash memory to the backend memory. These staged writes support minimal latency for the initial write (to the RAM-based data stage), and maintain data coherency with the backend memory. Cache reads also support minimal latency, for read data, since flash and RAM reads are relatively fast. Cache misses, for read data, result in data being read from the backend memory, and also cached in the flash-friendly cache for further accesses. Present embodiments of the flash-friendly cache thus optimize storage space and network bandwidth consumption.

Data caches are well known to provide frequently requested data quickly. Traditionally, data caches use RAM, which is limited in capacity and is shared with the operating system. Flash storage provides a cost-effective solution with large amounts of storage that is much faster than disk but a bit slower than RAM. However, flash memory has some peculiarities, in comparison to RAM. Flash writes are much slower than flash reads, and flash storage is written to efficiently in blocks at a block alignment. For example, in some types of flash memory, efficient block writes are at 1 MB (megabyte) block size and 1 MB or multiples of 1 MB alignment. Reads can be efficiently served even at page sizes of 4K (kilobytes).

Caching in typical systems is performed by reserving a certain amount of contiguous space that is managed at application-block-sized pages. Hash tables and free lists protected by locks indirect into these pages. This causes random writes to the underlying space. Therefore, typical caching schemes described above are not efficient for flash memory. In contrast, the flash-friendly cache described herein performs sequential, aligned writes to flash storage. For content-awareness, the file is chunked, and a hash key of each chunk is noted. Hash keys are fetched and kept in a file table when a file is first opened.

The flash-friendly cache is especially well-suited to copy data management (CDM) workloads, in which multiple copies of data are managed and served to multiple applications, for example in a software development and testing environment. In CDM environments, data read once is likely to be requested again, since the same dataset is being used by multiple virtual machines. This makes this data a good candidate to be cached. An immutable dataset or snapshot is picked up for running the workload, and the writes that happen to it are redirected. Writes are not required to be committed to persistent store immediately, they can be persisted lazily. Reads and writes are likely to be random most of the time, since most common cases are databases running on these datasets. The cache serves application datasets and hence I/Os (inputs and outputs) occur mostly aligned at 4K or 8K boundaries. Also, data sets are exported on pre-formatted virtual disks with a file system and options that are predetermined, so the file system block sizes are known.

Figure 1:
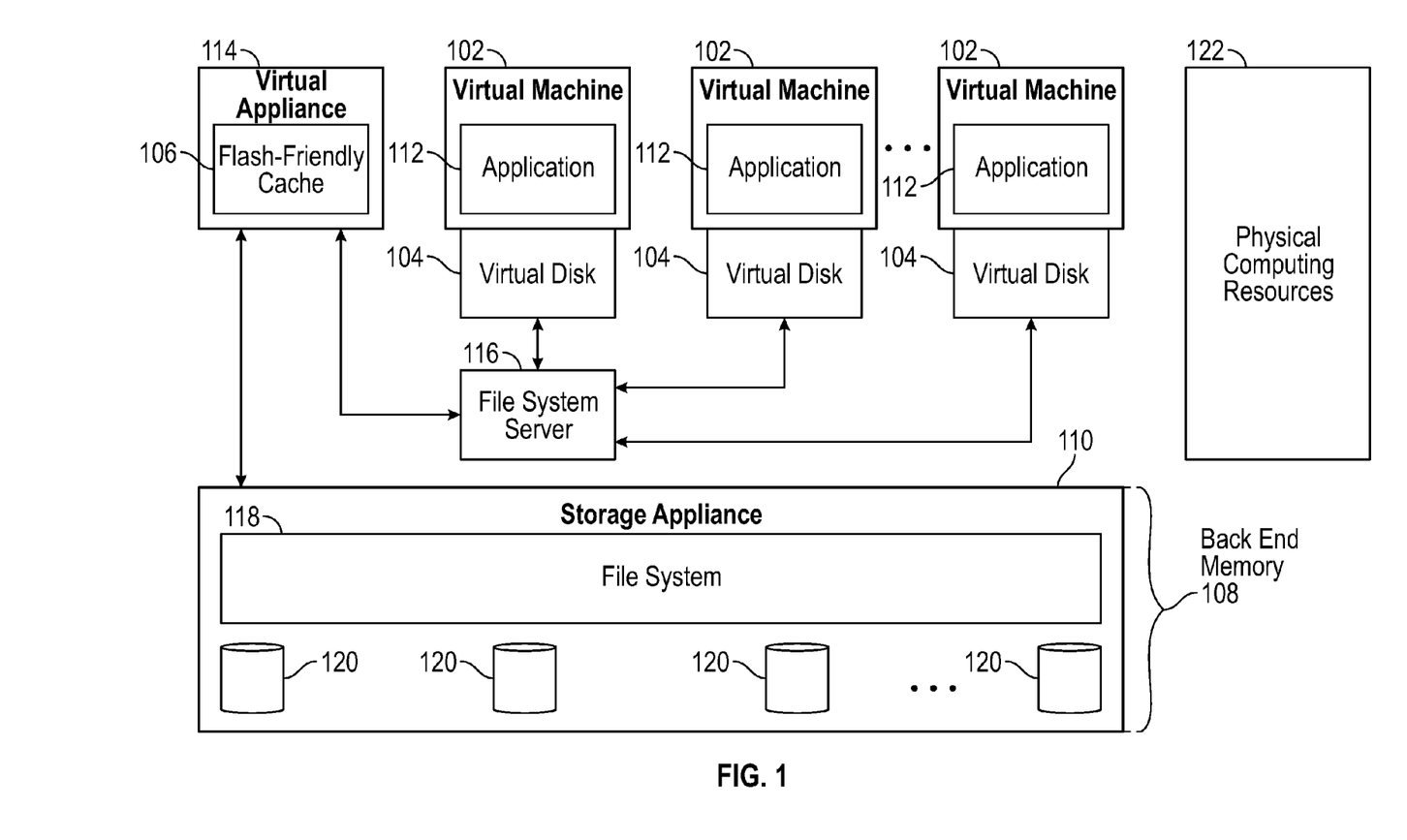
FIG. 1 is a system block diagram showing application virtual machines accessing data files through virtual disks served through a flash-friendly cache coupled to backend memory in the form of a storage appliance in accordance with some embodiments.

FIG. 1 is a system block diagram showing application virtual machines 102 accessing data files through virtual disks 104 served through a flash-friendly cache 106 coupled to backend memory 108 in the form of a storage appliance 110. The virtual machines 102, the virtual appliance 114 and the file system server 116 are implemented using the physical computing resources 122. Virtual disks 104 are implemented using the file system server 116 and the virtual appliance 114 with the flash-friendly cache 106. The storage appliance 110, with file system 118 and storage devices 120 implement the backend memory 108 as a storage system or virtual storage system implemented with physical resources. For example, backend memory 108 could have disk storage, solid-state storage, optical storage, network storage or virtualized storage memory, etc. In this scenario, the flash-friendly cache 106 in the virtual appliance 114 works well for development and test applications 112 that run over the same-base dataset. In some embodiments, the storage appliance 110 from which the virtual appliance 114 with the flash-friendly cache 106 fetches data has data deduplication capabilities, and the virtual appliance 114 is made aware of these capabilities. Effectively, if different application virtual machines 102 are accessing data sets of different points in time and thus have a lot of data commonality, this content-awareness further reduces the network I/O.

Typically, file systems monitor the I/O pattern when files are read and attempt to predict and prefetch data into RAM to be able to serve the applications better. These do not work on a remote file system 118, such as found in the storage appliance 110, since the ability to predict I/O patterns would be local to the virtual machines 102 and/or the virtual appliance 114, not the storage appliance 110. Hence, in this system and for these and related purposes, the data files are encapsulated within virtual disks 104 and served through the file system server 116 and the virtual appliance 114 with the flash-friendly cache 106.

As applications 112 in the virtual machines 102 read data that is stored in the backend memory 108, the file system server 116 and the virtual appliance 114 read the data from the flash-friendly cache 106, when the data is stored within and available for reading from the flash-friendly cache 106. When the data is not available in the flash-friendly cache 106, the read data is fetched from the backend memory 108 and cached in the flash-friendly cache 106 so as to be available for further reads. As applications 112 in the virtual machines 106 write data to be stored in the backend memory 108, the file system server 116 and the virtual appliance 114 write the data to the flash-friendly cache 106, where the data is staged for later writing to the backend memory 108.

By caching both application data reads and application data writes, the flash-friendly data cache 106 caches access to the files stored in the backend memory 108, which are represented in the virtual disk 104 files (known as VMDK or virtual machine disk files). This creates a file system data store on the file system server 116 with the server of the virtual appliance 114 and the flash-friendly cache 106 as the source of data. A differential virtual disk in front of the virtual machine disk file is created to capture the writes. This allows reuse of the redo log mechanisms of the system with the virtual machines 102, virtual appliance 114 and file system server 116, instead of having the storage appliance 110 do so. Storage for differential virtual machine disks can be in the virtual machine file system (VMFS) data store local to the virtual disks 104, file system server 116 and virtual appliance 114.

It should be appreciated that, although the present embodiments are illustrated in a scenario with applications 112 executing on virtual machines 102, and a virtual appliance 114 having the flash-friendly cache 106, the flash-friendly cache 106 is applicable to various further systems and scenarios involving various physical machines as well as other types of virtual machines. Essentially, a system with some type of backend memory 108 and need for a cache with flash memory 210 could benefit from, and is thus a candidate for, the flash-friendly cache 106.

Figure 2:
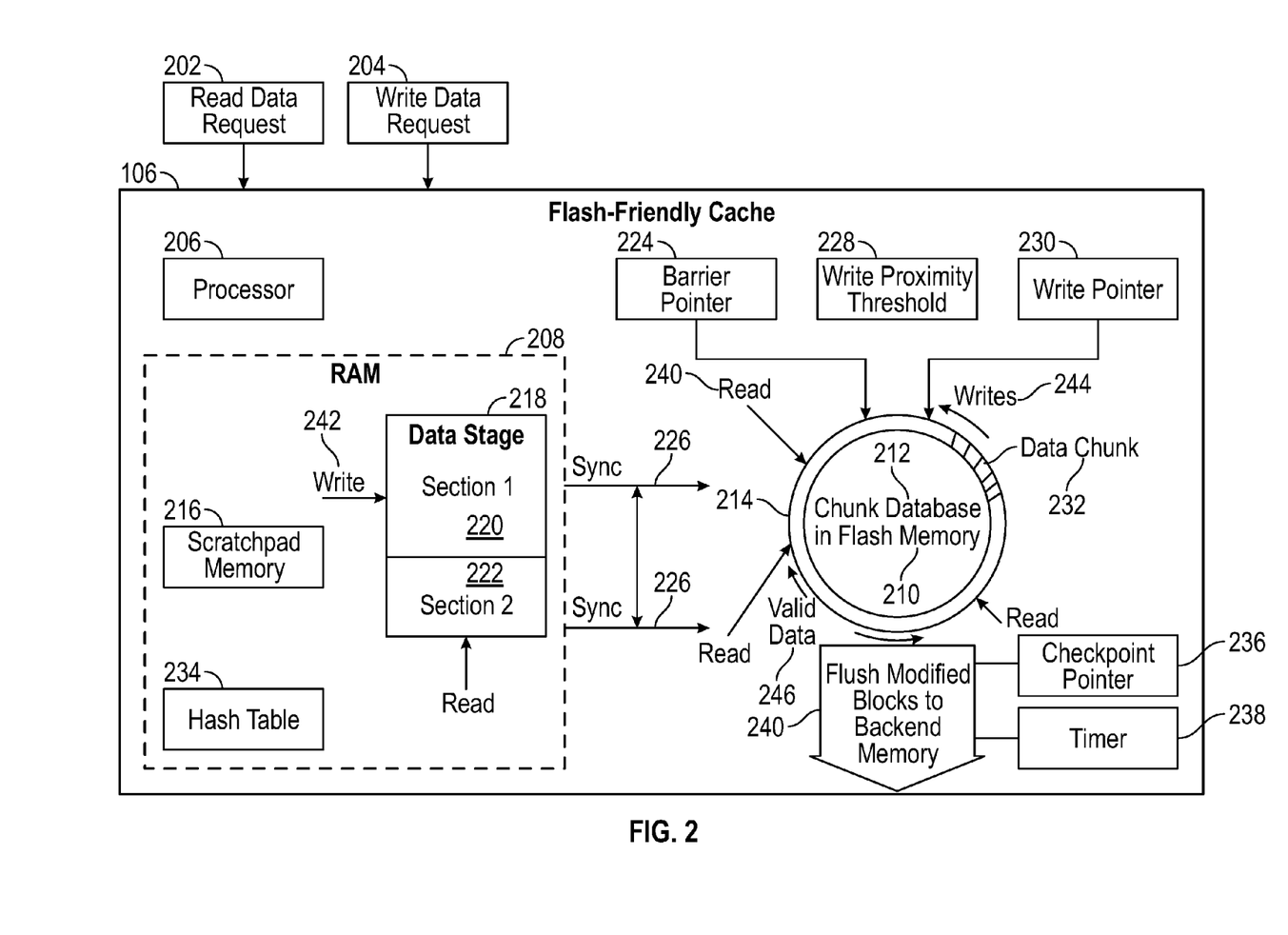
FIG. 2 is a block diagram of the architecture of the flash-friendly cache of FIG. 1 in accordance with some embodiments.

FIG. 2 is a block diagram of the architecture of the flash-friendly cache 106 of FIG. 1. A data stage 218 implemented in RAM 208 (i.e., a RAM-based data stage 218), and a chunk database 212 implemented in flash memory 210, form a core of the flash-friendly cache 106. Various support components, including a hash table 234 and scratchpad memory 216 are also implemented in RAM 208. In various embodiments, a write pointer 230, a barrier pointer 224, a checkpoint pointer 236, data for a timer 238 and other support components can be implemented in RAM 208, registers in the processor 206 and/or other types of memory or structures as readily devised by a person skilled in the art. The processor 206 can be a processor shared by other physical or virtual machines or dedicated to the flash-friendly cache 106, in various embodiments. Content awareness of the cache, e.g., to service read data requests 202 and write data requests 204 arriving at the flash-friendly cache 106, is provided by the hash table 234, embodiments of which are discussed with reference to FIGS. 3A and 3B. The scratchpad memory 216 can be used by a file system client for writing into, with read data from the backend memory 108 written into the scratchpad memory 216.

The flash-friendly cache 106 takes advantage of the fact that flash storage is very fast for data reads and also ensures the data is written with consideration given to the peculiarities of flash. For content-awareness, the file is chunked and a hash key of each chunk is noted. When a file is first opened, hash keys of the file are fetched and kept in a file table, as part of the hash table 234. A chunk database 212 is created as a large file on flash storage (i.e., flash memory 210). Size of the chunk database 212 is an integral multiple of the chunk size, i.e., the size of a data chunk 232 in the chunk database 212, which in some embodiments is an integral multiple of 1 MB. In the embodiment shown, the data cache is maintained in the chunk database 212 as a circular queue 214 and is written sequentially.

When an application 112 in a virtual machine 102 reads data, stored in the backend memory 108, the virtual appliance 114 looks up the hash key from the offset in the file table, in the hash table 234. The hash key is then looked up, also in the hash table 234, to determine if the data exists in the data stage 218 or the chunk database 212. As explained further with reference to FIGS. 3A and 3B. If the data does exist there, the data is read from the data stage 218 or the chunk database 212, as appropriate, and returned to the application 112. If the data is not in the data stage 218 or the chunk database 212, the data is fetched from the backend memory 108 (e.g., the storage appliance 110), cached, and returned to the application 112 in the virtual machine 102.

The data stage 218 acts as a front end for the flash cache, and provides a buffer to accumulate writes 242 before those are flushed as a large block to the flash cache, i.e., the chunk database 212 in flash memory 210. The flash-based queue (i.e., the circular queue 214 implementing the chunk database 212 in flash memory 210) is written at flash-block boundaries of multiple flash-block sizes at a time to be efficient, and not one chunk at a time. Thus, data in the RAM-based data stage 218 is synchronized to the chunk database 212 in aligned block writes as sync 226 operations. In some embodiments, the data stage 218 has two sections 220, 222, each 4 MB to 16 MB in size, although versions with a single section or three or more sections or other sizes could also be implemented. One section 220 or 222 is active at a time, and once that section 220 or 222 is full, the data stage 218 is switched atomically to the other area. The full, now previous area is scheduled for sync 226 to the flash-based queue. By atomically, it is meant that the switching occurs as a single, atomic operation, so that it is never the case that both stages 220 and 222 are accumulating at the same time or performing sync 226 at the same time. That is, a first section 220 of the data stage 218 accumulates data until there is sufficient data for an aligned block write. Once there is sufficient data for the aligned block write, the sections 220, 222 of the data stage 218 are switched. A sync 226 operation is performed, writing data from the first section 220 of the data stage 218 in an aligned block write to the chunk database 212 in flash memory 210, and the second section 222 of the data stage 218 is made available for accumulating data. When there is sufficient data in the second section 222 for an aligned block write, the sections 220, 222 of the data stage 218 are again switched. Another sync operation 226 is performed, writing data from the second section 222 of the data stage 218 to the chunk database 212, and the first section 220 of the data stage 218 is made available for accumulating data. This switching of sections 220, 222 of the data stage 218 continues for further sync 226 operations.

Data is looked up in the data stage 218 before it is looked up in the chunk database 212 in flash memory 210. The write pointer 230 tracks the position of the last write area in the chunk database 212, and indicates that data can be written at this location. A barrier pointer 224 indicates that all data between the barrier pointer 224 and the persistent write pointer 230 is valid, as shown by valid data 246. Page size, in some embodiments, is configurable and has a default of 8K. The write pointer 230 keeps advancing within the circular queue 214 as data is flushed from the data stage 218 in sync 226 operations (e.g., in aligned block writes 244 from the data stage 218 to the chunk database 212). When data is read from the chunk database 212, the distance from the read 240 to the write pointer 230 is computed. If this distance is less than a write proximity threshold 228, the data that is read from the chunk database 212 is again written to the data stage 218. It should be appreciated that the write proximity threshold 228 and the above-described action serve to preserve the frequently read blocks from getting evicted by the circular writes 244 in the chunk database 212. In some embodiments, the write proximity threshold 228 is computed as a function of the size of the chunk database 212 and the velocity of writes 244 into the chunk database 212.

For copy data management workloads, and in many other systems and scenarios, writes (e.g. from a write data request 204 arriving at the flash-friendly cache 106) do not need to be persisted immediately. Writes 242 are written to the same data stage 218 as for data reads from the backend memory 108. In some implementations, there are name spaces for keys and written data is kept in its own namespace. A fingerprint is computed for written data, and the write returns the fingerprint after writing data to the data stage 218. A mapping from the hash table 234 locates the written data, in the same way as data that is read into the data stage 218 or the chunk database 212 (i.e., data read from the backend memory 108 and then written to the data stage 218 and later written to the chunk database 212 in flash memory 210 as a sync 226 operation). Consistent with the behavior of the data stage 218 as a read cache, as the data stage 218 fills up with cached read data, cached write data, or combinations thereof, the contents of the data stage 218 get written to the chunk database 212 in an aligned block write.

Some of these blocks have been written to by the application 112, and some have been read by the application 112. One or more bits in the hash table 234 track modified blocks in the chunk database 212 in flash memory 210. Modified blocks are flushed to the backend memory 110, in a flush 240 operation, before blocks are evicted by the write pointer 230 and the writes 244 that advance the write pointer 230. This is tracked by a checkpoint pointer 236. As the write pointer 230 advances, the checkpoint pointer 236 keeps incrementing a count of modified blocks. Once this count reaches a certain configured maximum, i.e., a checkpoint threshold of a maximum number of modified blocks, or a certain time is elapsed, as measured on the timer 238, whichever comes first, a background thread starts from the current write pointer 230 location. The background thread scans for blocks that are marked modified, e.g. in the hash table 234, and writes these blocks from the chunk database 212 to the backend memory 108, until the last persisted checkpoint is reached. This is the flush 240 of modified blocks to the backend memory shown in FIG. 2. Once this happens, the noted write pointer 230 is persisted at the new checkpoint, and modified bits are cleared from the hash table 234, as described further with reference to FIGS. 3A and 3B. The modified block count is adjusted, for example resetting it to begin counting anew.

Figure 3A:
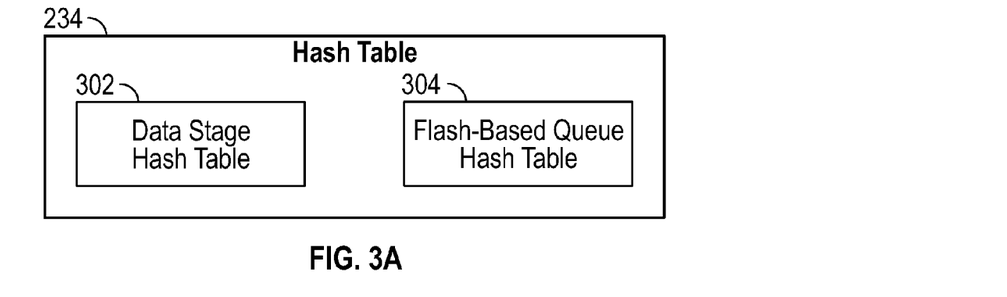
FIG. 3A is a block diagram of one version of the hash table of the flash-friendly cache of FIG. 2 in accordance with some embodiments.

FIG. 3A is a block diagram of one version of the hash table 234 of the flash-friendly cache 106 of FIG. 2. There is one hash table for the data stage, called the data stage hash table 302, and another hash table for the flash-based queue (i.e., the circular queue 214 implementing the chunk database 212 in flash memory 210), called the flash-based queue hash table 304. Each of these has a map, or the two structures share a map, that maps the cache key to the chunk information. The key can be a fingerprint, or in general, any identifier that uniquely identifies the data chunk data as stored in the cache in fixed-sized pages called chunks. The chunk information includes the address of the chunk in memory or cache, and optional fields. The optional fields include a list of entities waiting for a page to load, an access count, and a state that indicates whether the data is available in the cache (e.g., valid) or is scheduled for fetching (e.g., loading). Each of the hash tables in the hash table 234 has, or the hash tables share, chunk ID (identifier) to key vectors. In some embodiments, there are as many of these vectors as the number of flash-based queues and the size of each is equal to the flash-based queue to chunk size. In an alternate embodiment, there are as many such vectors as there are data chunks 232 or spaces for data chunks 232 in the chunk database 212.

Figure 3B:
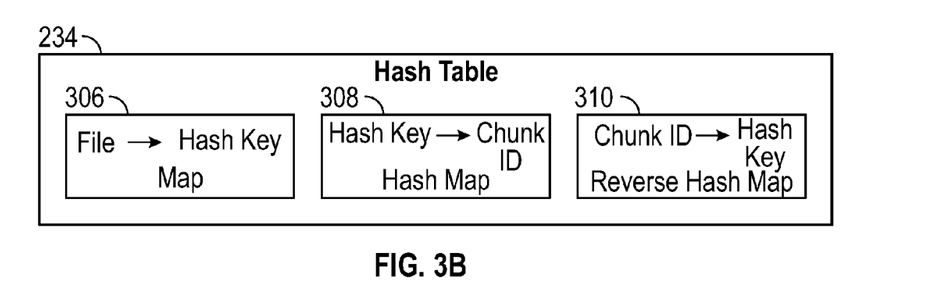
FIG. 3B is a block diagram of another version of the hash table of the flash-friendly cache of FIG. 2 in accordance with some embodiments.

FIG. 3B is a block diagram of another version of the hash table 234 of the flash-friendly cache 106 of FIG. 2. In this version of the hash table 234, there is a file to hash key map 306, a hash key to chunk ID hash map 308, and a chunk ID to hash key reverse hash map 310. In some embodiments, some or all of these indicate whether a specified chunk is located in the data stage 218 or the chunk database 212. A bit in each of the hash map 308 and the reverse hash map 310 tracks modified blocks. These bits are cleared upon completion of the flush 240 of the modified blocks to the backend memory 108 and persisting of the newly adjusted write pointer 230. In a variation, the embodiments of hash tables 234 of FIGS. 3A and 3B are combined, so that the data stage hash table 302 has a file to hash key map 306, a hash key to chunk ID hash map 308, and a chunk ID to hash key reverse hash map 310 relating to the data stage 218. The flash-based queue hash table 304 includes a file to hash key map 306, a hash key to chunk ID hash map 308, and a chunk ID to hash key reverse hash map 310 relating to the chunk database 212 in flash memory 210. Further combinations and variations of the hash table 234 are readily devised in keeping with the teachings herein.

Figure 4:
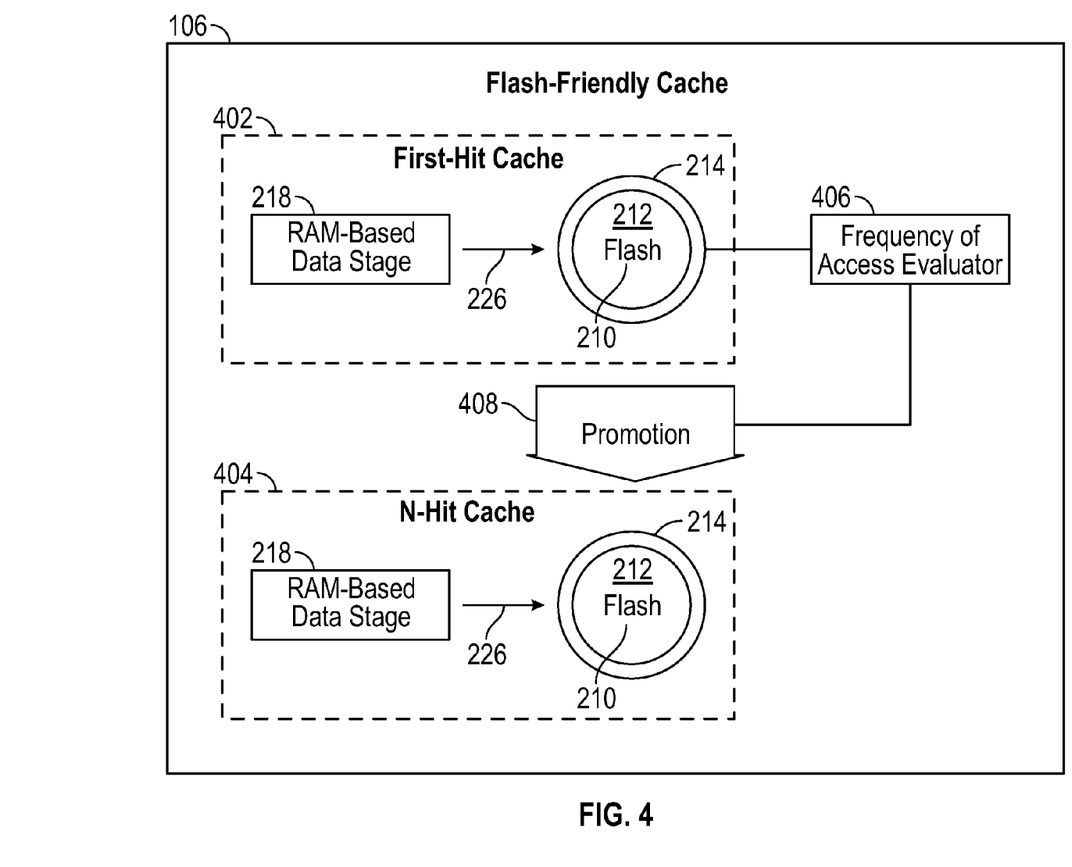
FIG. 4 is a block diagram of a further embodiment of the flash-friendly cache, with a first-hit cache and an N-hit cache.

FIG. 4 is a block diagram of a further embodiment of the flash-friendly cache 106, with a first-hit cache 402 and an N-hit cache 404. Each of these has a RAM-based data stage 218 and a circular queue 214 implementing a chunk database 212 in flash memory 210, with sync 226 operations performing aligned block writes from the data stage 218 to the chunk database 212 as described above with reference to FIGS. 1-3B. The first-hit cache 402 preserves data as soon as the data is read the first time, with the hopes that the data will be needed again by the same or other application virtual machines 102 running similar workloads. The velocity of the write pointer 230 for a first-hit cache may be quite high, which increases the probability of a cache miss (due to equally rapid eviction of data chunks 232 ahead of the advancing write pointer 230) and hence makes the cache less effective. The added N-hit cache 404 preserves data chunks that are read N times or more. This N-hit cache 404 runs in parallel to the first-hit cache 402, and data chunks get promoted from the first-hit cache to the N-hit cache based on their frequency of access. Note that the frequency of access evaluation of data chunks happens independently to the data read proximity to the write pointer 230 in the first-hit cache 402. This evaluation is performed by a frequency of access evaluator 406, which counts reads 240 of data chunks 232 in the chunk database 212 of the first-hit cache 402 regardless of where the read occurs relative to the write pointer 230, and engages the promotion 408 operation for data chunks 232 that are read at least N times. In some versions, the promotion 408 is one data chunk 232 at a time, in others there are groups of data chunks 232 that get promoted. To promote a data chunk 232 from the first-hit cache 402 to the N-hit cache 404, the data chunk 232 is written from the chunk database 212 of the first-hit cache 402 to the N-hit cache 404, (e.g., to the data stage 218 of the N-hit cache 404), and corresponding hash tables 234 are adjusted accordingly. In some embodiments, this takes the form of deletion of hash information for the promoted data chunk 232 from the hash table 234 of the first-hit cache 402 (e.g., using the reverse hash map 310), and addition of hash information for the promoted data chunk 232 to the hash table 234 of the N-hit cache 404. In further embodiments, this takes the form of updating the information in a hash table 234 to indicate that the promoted data chunk 232 is in the N-hit cache 404, not the first-hit cache 402.

Cache persistence is important as flash storage sizes are large and it takes quite some time to warm-up the flash-friendly cache 106 with valid data. A problem with flash caches is that the metadata updates are often small, and to make the cache persistent, the cache metadata has to be persisted, therefore small updates have to be written to flash or disk.

The data cache is already persistent on flash storage, in the flash-friendly cache 106. Persisting the metadata will make the whole cache itself persistent and reusable across reboots of the system. Due to the characteristics of copy data management workloads, cache persistence can be done lazily by accumulating updates to form larger writes. Also, the circular nature of the cache (in embodiments with the circular queue 214) lends itself to making the metadata updates contiguous. The chunk-to-key vector constitutes the metadata from which all other metadata can be constructed, and this can be persisted periodically. When the amount of modified data crosses a threshold (say, 1 MB), which may be approximately 64K entries, which is equivalent to 64G (gigabytes) worth of modified data in flash, it triggers flushing that data from flash to disk storage or other backend memory 108. The persisted Barrier Pointer (BP) notes the start of valid persistent cache data from the BP until the persisted Write Pointer (WP), which notes the end of valid persistent data. The write pointer(s) 230 and barrier pointer(s) 224 (e.g., singular in embodiments based on FIG. 2, and plural in embodiments based on FIG. 4) are periodically persisted along with the range between them in the chunk ID to hash key vector. The data in the chunk database 212 between the barrier pointer 224 and the write pointer 230 is considered persisted and valid on reboot. The barrier pointer 224 forms a barrier to the write pointer 230. The write pointer 230 is never supposed to cross the barrier noted by the barrier pointer 224. When the metadata is persisted, the barrier moves. When the write pointer 230 comes close to the barrier, it is a good time to persist the metadata. If the write pointer crosses the barrier, the flash cache is no longer persistent. That is, the data validity of the persisted cache is not known across reboots.

Figure 5A:
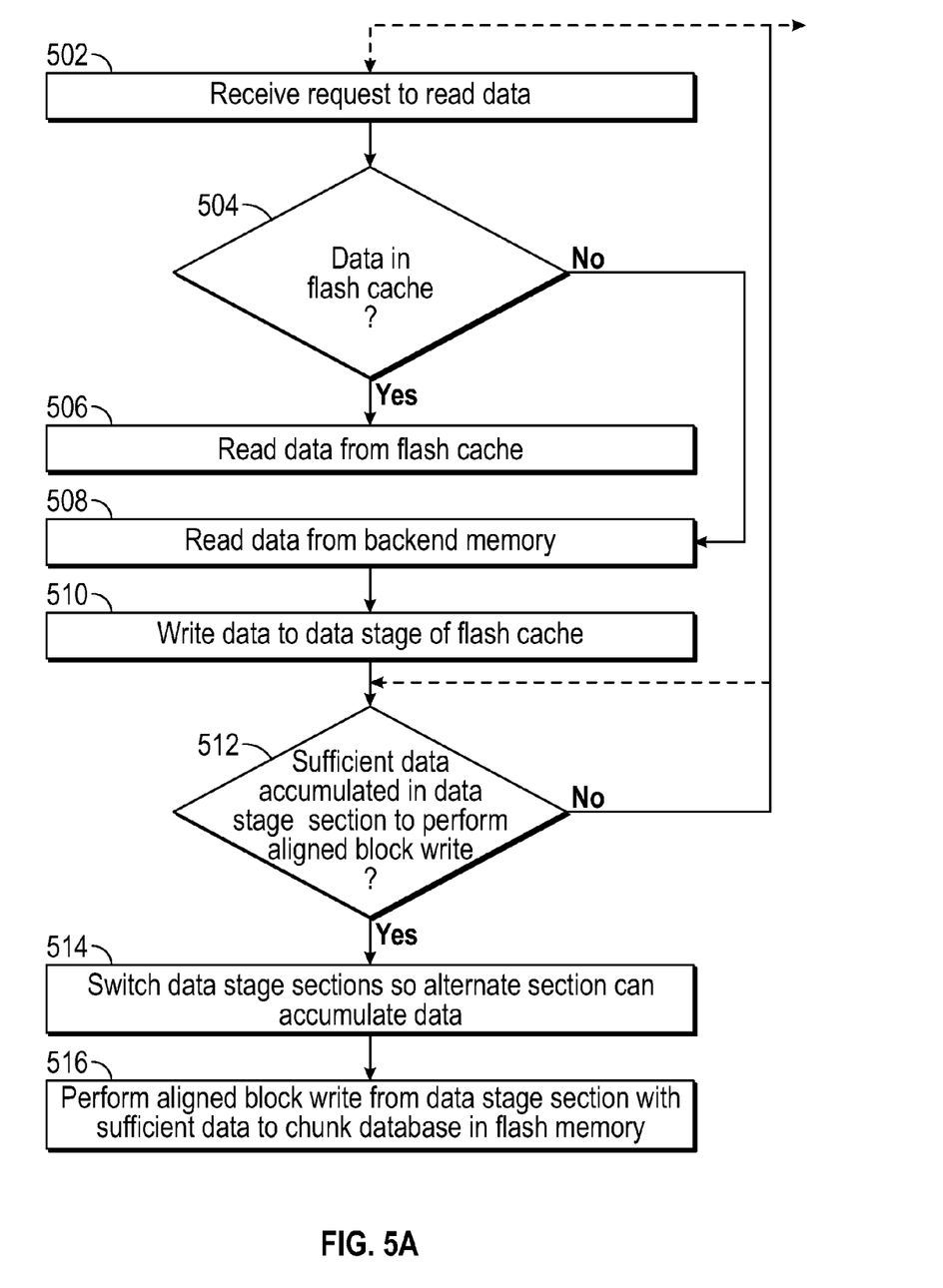
FIG. 5A is a flow diagram of a method of flash-friendly caching, for read requests, which can be practiced on embodiments of the system depicted in FIGS. 1-4.

FIG. 5A is a flow diagram of a method of flash-friendly caching, for read requests, which can be practiced on embodiments of the system depicted in FIGS. 1-4. The method can be practiced by one or more processors, such as a processor dedicated to the flash-friendly cache or a processor shared with a virtual machine or virtual appliance or a physical machine or physical appliance. In an action 502, a request to read data is received. For example, the request could be received from a file system server, a virtual disk, a virtual machine, an application, or a physical machine, etc., for reading data that is stored in backend memory such as in a storage system or storage appliance. In decision action 504, it is determined whether the data is in a flash cache. If the answer is yes, the data is in the flash cache, flow proceeds to the action 506, and the data is read from the flash cache. If the answer is no, the data is not in the flash cache, flow proceeds to the action 508, and the data is read from the backend memory.

Still referring to FIG. 5, once data is read from the backend memory, flow proceeds to the action 510, in which the data is written to the data stage of the flash cache. Flow then proceeds to the decision action 512. In the decision action 512, it is determined whether there is sufficient data accumulated in a data stage section to perform an aligned block write. If the answer is no, there is insufficient data for an aligned block write, flow branches back to the action 502, the action 512, or elsewhere, e.g., to receive a request to write data or perform other tasks. If the answer is yes, there is sufficient data for an aligned block write, flow proceeds to the action 514. In the action 514, data stage sections are switched, so that the alternate section of the data stage can accumulate data. Then, in the action 516, the aligned block write is performed, writing from the data stage section with sufficient data to the chunk database in flash memory.

Figure 5B:
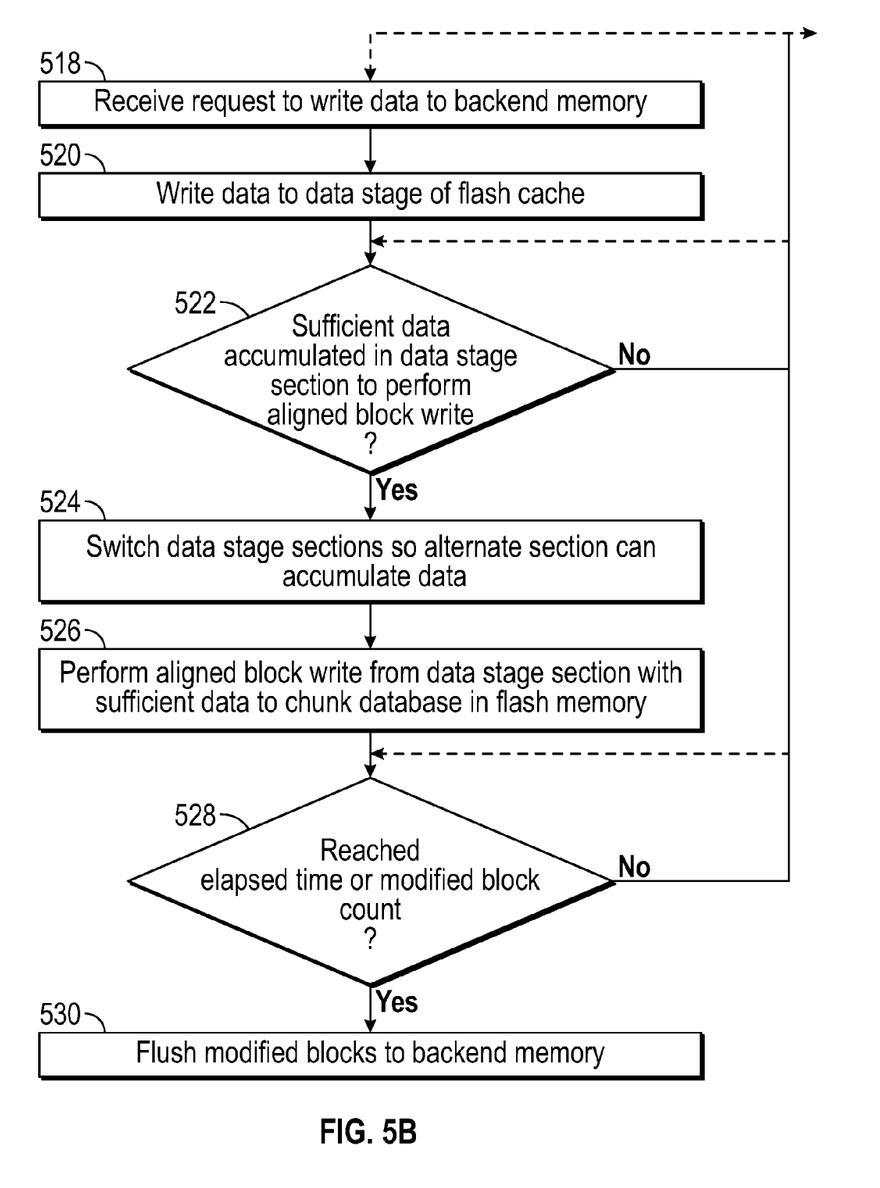
FIG. 5B is a flow diagram of a method of flash-friendly caching, for write requests, which can be practiced on embodiments of the system depicted in FIGS. 1-4.

FIG. 5B is a flow diagram of a method of flash-friendly caching, for write requests, which can be practiced on embodiments of the system depicted in FIGS. 1-4. The method can be practiced by one or more processors, such as a processor dedicated to the flash-friendly cache or a processor shared with a virtual machine or virtual appliance or a physical machine or physical appliance. In an action 518, a request to write data is received. For example, the request could be received from a file system server, a virtual disk, a virtual machine, an application, or a physical machine, etc., for writing to backend memory such as in a storage system or storage appliance.

In an action 520, the data is written to the data stage of the flash cache. For example, the data could be written to whichever section of the data stage is currently switched in for accumulation of data. In a decision action 522, it is determined whether sufficient data is accumulated in the data stage section, to perform an aligned block write. If the answer is no, there is insufficient data for an aligned block write, flow branches back to the decision action 522, the action 518, or elsewhere, e.g., to receive a request to read data or perform other tasks. If the answer is yes, there is sufficient data for an aligned block write, flow proceeds to the action 524.

In the action 524, data stage sections are switched, so that the alternate section of the data stage can accumulate data. Then, in the action 526, the aligned block write is performed, writing from the data stage section with sufficient data to the chunk database in flash memory. In a decision action 528, it is determined whether an elapsed time has been reached or a modified block count has been reached. If the answer is no, neither of these has been reached, flow branches back to the action 528, the action 522, or the action 518, or elsewhere, e.g., to receive a request to read data or perform other tasks. If the answer is yes, either the elapsed time or the modified block count has been reached, flow proceeds to the action 530, in which the modified blocks are flushed to the backend memory.

Figure 6:
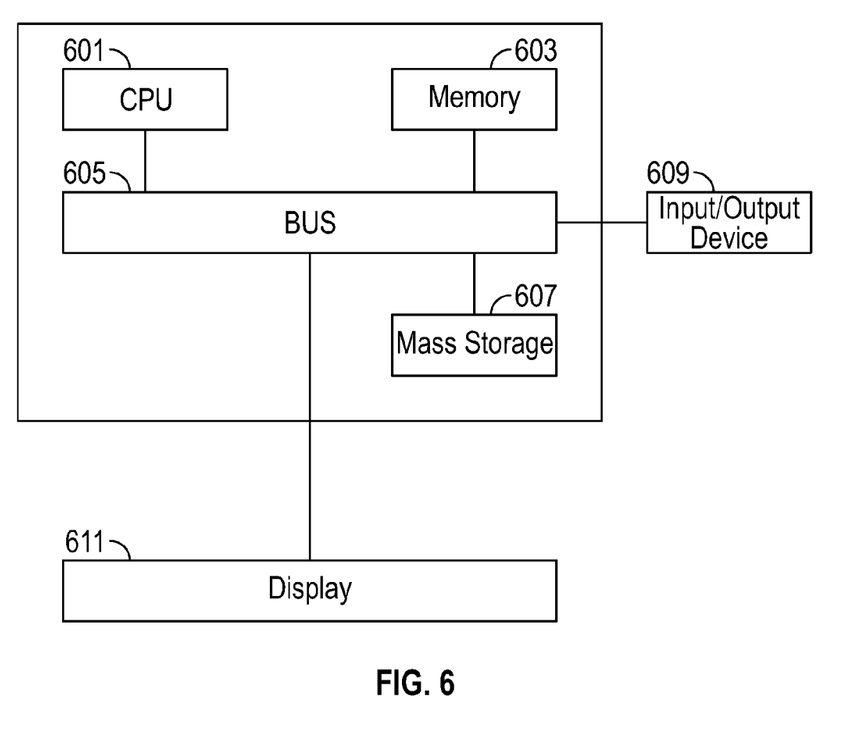
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for flash-friendly caching in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5B. The code embodying this functionality may be stored within memory 603 or mass storage device 607 for execution by a processor such as CPU 601 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A processor-based method for flash-friendly caching; comprising:
   reading data from a first memory;
   writing the data to a second memory, in a cache;
   performing a first aligned block write of data from the second memory in the cache to a flash memory in the cache, responsive to accumulating sufficient data for the aligned block write;
   switching alternating sections of the second memory, responsive to the accumulating sufficient data for the aligned block write; and
   accumulating further data for a subsequent aligned block write while the first aligned block write is performed.

2. The method of claim 1, further comprising:
   determining whether data that is stored in the first memory is available for reading from the second memory of the cache; and
   determining whether the data that is stored in the first memory is available for reading from the flash memory of the cache, responsive to determining that the data that is stored in the first memory is not available for reading from the second memory.

3. The method of claim 1, further comprising:
   searching for the data in a first hash table for the second memory, and, responsive to not finding the data in the first hash table, searching for the data in a second hash table for the flash memory.

4. The method of claim 1, wherein the cache is a first-hit cache, and further comprising:
   promoting data from the first-hit cache to an N-hit cache having a further flash memory and a further second memory, responsive to determining that the data being promoted is read at least N times in the first-hit cache, where N is an integer.

5. The method of claim 1, wherein the first memory includes at least one of disk storage, network storage, or virtualized storage memory.

6. The method of claim 1, further comprising:
   receiving a request to write data to the first memory;
   writing the write data to the second memory;
   tracking modified blocks, arising from at least the write data, in the flash memory; and
   writing the modified blocks from the flash memory to the first memory, responsive to the tracking reaching a predefined limit.

7. A tangible, non-transitory, computer-readable media having instructions thereupon which, when executed by a processor, cause the processor to perform a method comprising:
   reading data from a first memory that his external to a cache;
   writing the data to a second memory that is internal to the cache;
   writing, using an aligned block write, data from the second memory to a flash memory that is internal to the cache, responsive to accumulating sufficient data in the second memory for the aligned block write;
   switching alternating sections of the second memory, responsive to the accumulating sufficient data for the aligned block write; and
   accumulating further data for a subsequent aligned block write while the aligned block write is performed.

8. The computer-readable media of claim 7, wherein the accumulating and the performing the aligned block write further comprise:
   accumulating a first sufficient amount of data in a first section of the second memory to perform a first aligned block write;
   performing the first aligned block write from the first section of the second memory to the flash memory;
   accumulating a second sufficient amount of data in a second section of the second memory to perform a second aligned block write; and
   performing the second aligned block write from the second section of the second memory to the flash memory.

9. The computer-readable media of claim 7, wherein the method further comprises:
   consulting a first hash table to determine whether the data is in the second memory; and
   consulting a second hash table to determine whether the data is in the flash memory, responsive to determining that the data is not in the second memory.

10. The computer-readable media of claim 7, wherein the method further comprises:
    determining that data in the cache is read at least N times; and
    promoting the data that is read at least N times from the cache, as a first-hit cache, to an N-hit cache having a further flash memory and a further second memory with aligned block writes from the further second memory to the further flash memory.

11. The computer-readable media of claim 7, wherein the method further comprises:
    writing write data to the second memory, responsive to receiving a request to write the write data to the first memory;
    counting modified blocks, arising from at least the write data, in the flash memory; and
    writing the modified blocks from the flash memory to the first memory, responsive to reaching a predetermined time limit or the counting the modified blocks reaching a predefined count limit.

12. The computer-readable media of claim 7, wherein the method further comprises:
    comparing a distance of a data read from a chunk database in the flash memory to a write pointer of the chunk database; and
    rewriting data of the data read to the second memory, responsive to determining that the distance is within a write proximity threshold.

13. A flash-friendly caching system, comprising:
    a second memory, having RAM (random access memory);
    a flash memory, coupled to the second memory, the second memory and the flash memory forming a cache; and a processor, coupled to a first memory and the cache, and configured to perform actions comprising:
  reading requested read data from the first memory, responsive to determining that the requested read data is not available in the cache;
  writing the read data to the second memory, responsive to reading the read data from the first memory;
  writing data from the second memory to the flash memory as an aligned block write, responsive to accumulating sufficient data in the second memory to perform the aligned block write;
  switching alternating sections of the second memory, responsive to the accumulating sufficient data for the aligned block write; and
  accumulating further data for a subsequent aligned block write while the first aligned block write is performed.

14. The flash-friendly caching system of claim 13, further comprising:
  a first hash table, configured to look up data in the second memory;
  a second hash table, configured to look up data in the second memory; and
  the processor further configured to look up the requested read data in the first hash table and look up the requested read data in the second has table responsive to not finding the read data with the first hash table.

15. The flash-friendly caching system of claim 13, further comprising:
  the second memory having a first section and a second section, configured to alternate so that the second section accumulates data while the first section has a first aligned block write to the flash memory, and the first section accumulates data while the second section has a second aligned block write to the flash memory.

16. The flash-friendly caching system of claim 13, further comprising:
  a checkpoint pointer, configured to count modified blocks in the flash memory and direct a flush of the flash memory to the first memory.

17. The flash-friendly caching system of claim 13, further comprising:
  a barrier pointer, configured to track a first end of valid data in a circular buffer in the flash memory; and
  a write pointer, configured to track a second end of the valid data in the circular buffer, such that a further aligned block write to the flash memory starts at the write pointer.

18. The flash-friendly caching system of claim 13, wherein the cache is a first-hit cache and further comprising:
  an N-hit cache having a further second memory and a further flash memory; and
  the processor further configured to promote a data chunk from the first-hit cache to the N-hit cache, responsive to the data chunk being read at least N times from the first-hit cache, wherein frequency of access evaluation of data chunks in the first-hit cache is independent of data read proximity to a write pointer of the first-hit cache.

19. The flash-friendly caching system of claim 13, further comprising:
  a file to hash key map for the cache;
  a hash key to chunk ID (identifier) map for the cache; and
  a chunk ID to hash key reverse hash map for the cache.

* * * * *